US010823130B2

(12) United States Patent
Jun et al.

(10) Patent No.: US 10,823,130 B2
(45) Date of Patent: Nov. 3, 2020

(54) GAS HEAT PUMP AND CONTROL METHOD THEREFOR

(71) Applicant: LG ELECTRONICS INC., Seoul (KR)

(72) Inventors: Jihoon Jun, Seoul (KR); Kwanho Yum, Seoul (KR); Song Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/478,215

(22) PCT Filed: Jan. 16, 2018

(86) PCT No.: PCT/KR2018/000703
§ 371 (c)(1),
(2) Date: Jul. 16, 2019

(87) PCT Pub. No.: WO2018/131978
PCT Pub. Date: Jul. 19, 2018

(65) Prior Publication Data
US 2020/0032759 A1    Jan. 30, 2020

(30) Foreign Application Priority Data

Jan. 16, 2017    (KR) .................... 10-2017-0007051

(51) Int. Cl.
*F02P 3/045* (2006.01)
*F02P 3/08* (2006.01)
(Continued)

(52) U.S. Cl.
CPC ................ *F02P 3/08* (2013.01); *F02P 3/045* (2013.01); *F25B 30/02* (2013.01); *F25B 49/02* (2013.01)

(58) Field of Classification Search
CPC ... F02P 3/08; F02P 3/045; F25B 49/02; F25B 30/02
(Continued)

(56) References Cited

FOREIGN PATENT DOCUMENTS

| JP | 11-247748 | 9/1999 |
|---|---|---|
| JP | 2001-323866 | 11/2001 |

(Continued)

OTHER PUBLICATIONS

International Search Report (English Translation) dated Apr. 19, 2018 issued in Application No. PCT/KR2018/000703.
(Continued)

*Primary Examiner* — Hai H Huynh
(74) *Attorney, Agent, or Firm* — Ked & Associates, LLP

(57) ABSTRACT

The present invention relates to a gas heat pump and a control method therefor and, according to the present invention, the method for controlling a gas heat pump, which comprises an ignition plug and a gas engine having an engine combustion unit including a plurality of combustion spaces, may include: a target setting step of setting a target ignition energy amount on the basis of a refrigerant load amount determined according to a driving condition of the gas heat pump; an ignition step of igniting fuel injected into the combustion spaces; a comparison step of comparing an output energy amount emitted in the ignition step with a target ignition energy amount set in the target setting step; and a step of changing an energy amount required to ignite the fuel when the output energy amount and the target ignition energy amount do not coincide in the comparison step.

15 Claims, 6 Drawing Sheets

(51) Int. Cl.
*F25B 30/02* (2006.01)
*F25B 49/02* (2006.01)

(58) Field of Classification Search
USPC .......... 123/3, 62, 68, 69 R, 70 R, 71 R, 609, 123/610, 611
See application file for complete search history.

(56) References Cited

FOREIGN PATENT DOCUMENTS

| | | |
|---|---|---|
| JP | 2002-061558 | 2/2002 |
| JP | 2007-127369 | 5/2007 |
| JP | 2008-291721 | 12/2008 |
| JP | 2016-011606 | 1/2016 |
| JP | 2016-113921 | 6/2016 |
| KR | 10-2013-0093297 | 8/2013 |

OTHER PUBLICATIONS

Written Opinion (English Translation) dated Apr. 19, 2018 issued in Application No. PCT/KR2018/000703.
Korean Office Action dated Jul. 2, 2018 issued in KR Application No. 10-2017-0007051.

GAS HEAT PUMP AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2018/000703, filed Jan. 16, 2018, which claims priority to Korean Patent Application No. 10-2017-0007051, filed Jan. 16, 2017, whose entire disclosures are hereby incorporated by reference.

TECHNICAL FIELD

The present disclosure relates to gas heat pumps and control methods thereof, in which an amount of energy generated from an ignition plug is calculated and then an ignition condition varies based on the calculated amount.

BACKGROUND ART

A refrigerating cycle generally refers to a cycle in which the circulation cycle of a refrigerant is used to supply heat or absorb heat to or from a target location. A compressor, a condenser, an expansion valve and an evaporator are used to implement this refrigerating cycle. These components are interconnected to each other via refrigerant pipes. Using a phase change of the refrigerant, the condenser supplies heat to the surrounding and the evaporator absorbs the heat from the surrounding.

In this connection, the condenser and the evaporator may be configured to perform heat exchange between the refrigerant and air or other fluids. Therefore, the condenser and the evaporator may be referred to as a heat exchanger, which may be divided into the condenser and evaporator based on the state of refrigerant before and after the heat exchange.

An apparatus or system for heating or cooling indoor air using such a refrigerating cycle is referred to as an air conditioner. To heat the room by the air conditioner, the refrigerant supplies heat to the room air. Therefore, in this case, an indoor unit may be referred to as a condenser, and an outdoor unit may be referred to as an evaporator. Conversely, in order to cool the room by the air conditioner, the refrigerant absorbs the heat from the room air. Therefore, in this case, the indoor unit may be referred to as an evaporator, and the outdoor unit may be referred to as a condenser.

Unlike the home, large capacity compressors are required air conditioning for industrial use and in large buildings. That is, a gas heat pump system using a gas engine rather than an electric motor to drive a compressor for compressing a large amount of refrigerant into a high-temperature and high-pressure gas is widely used.

This gas heat pump system generates the power to drive the compressor using an engine that burns the gas to realize the refrigerating cycle.

Generally, the gas heat pump system is configured for heating or cooling by operating the compressor using a driving force of a gas engine. This system is composed of a refrigerant circulation system 100 and an engine cooling water circulation system 200, as shown in FIG. 1.

The refrigerant circulation system defines a refrigeration cycle or a heat pump cycle for cooling or heating the indoor and includes a compressor driven by a gas engine 500 to compress refrigerant, a four-way valve 15, an outdoor unit heat exchanger 16, a heating expansion valve 17, an indoor unit expansion valve 18, an indoor unit heat exchanger 19, and an accumulator 13.

The engine cooling water circulation system 200 circulates engine cooling water to cool the gas engine 500 and includes an engine cooling water three-way valve 21, a radiator 22, an engine cooling water circulation pump 23, an exhaust gas heat exchanger 24, and the like.

Further, an auxiliary heat exchanger 25 is installed between the refrigerant circulation system 100 and the engine cooling water circulation system 200 such that the refrigerant is evaporated via heat exchange between refrigerant and engine cooling water.

During the cooling operation of the conventional gas engine based cooling/heating apparatus, the four-way valve 15 is switched as indicated by a solid arrow in FIG. 1. Accordingly, the refrigerant compressed by the compressor 14 driven by the gas engine 500 and brought into a state of high temperature and high pressure passes through the four-way valve 15 switched to the cooling operation mode, and then is condensed in the outdoor unit heat exchanger 16 functioning as a condenser and thus discharges the condensation heat to the outside air. The condensed liquid refrigerant is decompressed in the indoor expansion valve 18, and then flows into the indoor heat exchanger 19 functioning as an evaporator in a state of a low temperature and low pressure and then evaporates therein. In this way, the cooling is achieved by absorbing the latent heat required in the evaporation process from the air in the room.

Further, the refrigerant passing through the indoor heat exchanger 19 passes through the accumulator 13 and then only the gaseous refrigerant is sucked into the compressor, thereby forming the refrigeration cycle continuously.

Further, during the cooling operation, the engine cooling water that has cooled the gas engine 500 is guided to the radiator 22 via the engine cooling water three-way valve 21 and discharge heat to the outside air in the radiator 22 and then passes through the exhaust gas heat exchanger 24 by the engine coolant circulation pump 23 and then returned to the gas engine 500.

However, during the heating operation, the four-way valve 15 is switched as indicated by the dotted arrow in FIG. 1. Thus, the refrigerant of high temperature and high pressure as compressed by the compressor 14 flows into the indoor unit I and is condensed in the indoor unit heat exchanger 19 functioning as a condenser, such that heating occurs using the condensation heat released into the indoor air. The refrigerant in the condensed liquid state is decompressed to a state of low temperature and low pressure while passing through the heating expansion valve 17. Then, the refrigerant then flows into the outdoor heat exchanger 16 functioning as an evaporator and starts to evaporate therein.

Further, the temperature of the outside air is usually low during the winter season when the heating operation is performed. Accordingly, to lower the evaporation temperature, the power required for the compressor increases, which causes the performance of the heat pump cycle to deteriorate. To prevent this situation, a portion of the engine exhaust heat is recovered and used as a heat source for evaporating the refrigerant. That is, during the heating operation, the engine cooling water that has cooled the gas engine 500 is guided to the auxiliary heat exchanger 25 side via the engine cooling water three-way valve 21, and thus heats the refrigerant flowing into the auxiliary heat exchanger 25 through the outdoor heat exchanger 16 to evaporate the refrigerant.

In this way, the refrigerant evaporated while sequentially passing through the outdoor heat exchanger 16 and the auxiliary heat exchanger 25 passes through the accumulator 13 such that only the gaseous refrigerant is sucked into the compressor 14. Thus, the heat pump cycle is continuously formed.

The conventional gas heat pump system is disclosed in Korean Patent Application Publication No. 10-2013-0093297.

Further, in the conventional gas heat pump system, the output of the gas engine 500 was adjusted via the voltage control applied to an ignition plug provided inside the gas engine 500. However, when the output of the gas engine 500 is controlled only via the voltage control, there is present a problem that optimum ignition energy output cannot be obtained in a compressor rotation region and a region requiring high torque based on an operating condition of the refrigerant cycle (selection between cooling and heating, and temperature selection).

DISCLOSURE

Technical Purposes

The present disclosure provides a gas heat pump and a control method thereof that can vary the dwell time according to the amount of ignition energy emitted from an ignition plug.

Further, the present disclosure provides a gas heat pump and a control method thereof that can control a magnitude of a voltage supplied to the ignition plug.

Further, the present disclosure provides a gas heat pump and a control method thereof in which whenever a discharge occurs in the ignition plug, feedback thereof may be provided.

The technical purposes to be achieved in accordance with the present disclosure are not limited to the technical purposes as mentioned above. Other technical purposes as not mentioned may be clearly understood by those skilled in the art to which the present disclosure belongs, from the following descriptions.

Technical Solutions

In a first aspect to achieve the purpose of the present disclosure, there is provided a method for controlling a gas heat pump, wherein a gas heat pump includes a gas engine having an engine combustion unit including a plurality of combustion chamber, each chamber having an ignition plug, wherein the method comprises: setting a target ignition energy amount based on a refrigerant load determined based on an operating condition of the gas heat pump; igniting fuel injected into each combustion chamber; comparing an actual output energy amount generated from the ignition with the set target ignition energy amount; and changing an amount of energy required to ignite the fuel when the output energy amount and the target ignition energy amount are not equal to each other.

In a second aspect to achieve the purpose of the present disclosure, there is provided a gas heat pump comprising: a compressor for compressing refrigerant; a gas engine for driving the compressor, wherein the gas engine includes an engine combustion unit having a plurality of combustion chambers; an ignition plug disposed on each of the engine combustion chambers, wherein the plug applies an impulse voltage; and a controller for controlling a voltage and current applied to the ignition plug and a discharge time of the plug, wherein the controller is configured for: determining a refrigerant load based on an operating condition of the gas heat pump; setting a target ignition energy amount based on the refrigerant load; comparing an actual output energy amount generated from ignition of the plug with the target ignition energy amount; and changing an amount of energy required to ignite the fuel based on the comparison result.

Technical Effects

The present disclosure has following effects.

The present disclosure has the effect of varying the dwell time depending on the amount of ignition energy emitted from the ignition plug and thus enabling precise control.

Furthermore, the present disclosure has the effect of controlling the magnitude of the voltage supplied to the ignition plug.

Further, the present disclosure has the effect of providing feedback to the discharge whenever the discharge occurs in the ignition plug, and of immediately coping with the changes in heating/cooling and temperature settings.

The effects from the present disclosure are not limited to the effects as mentioned above. Other effects as not mentioned may be clearly understood by those skilled in the art to which the present disclosure belongs, from the following descriptions.

DETAILED DESCRIPTION

Hereinafter, embodiments of the present disclosure will be described in detail with reference to the accompanying drawings.

While the present disclosure permits various modifications and variations, specific embodiments thereof are shown by way of example with reference to the drawings and will be described in detail below. However, those embodiments are not intended to limit the present disclosure to the particular form as disclosed. Rather, the present disclosure includes all modifications, equivalents and substitutions consistent with a spirit and scope of the present disclosure as defined by the claims.

It will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section.

Figure 1:
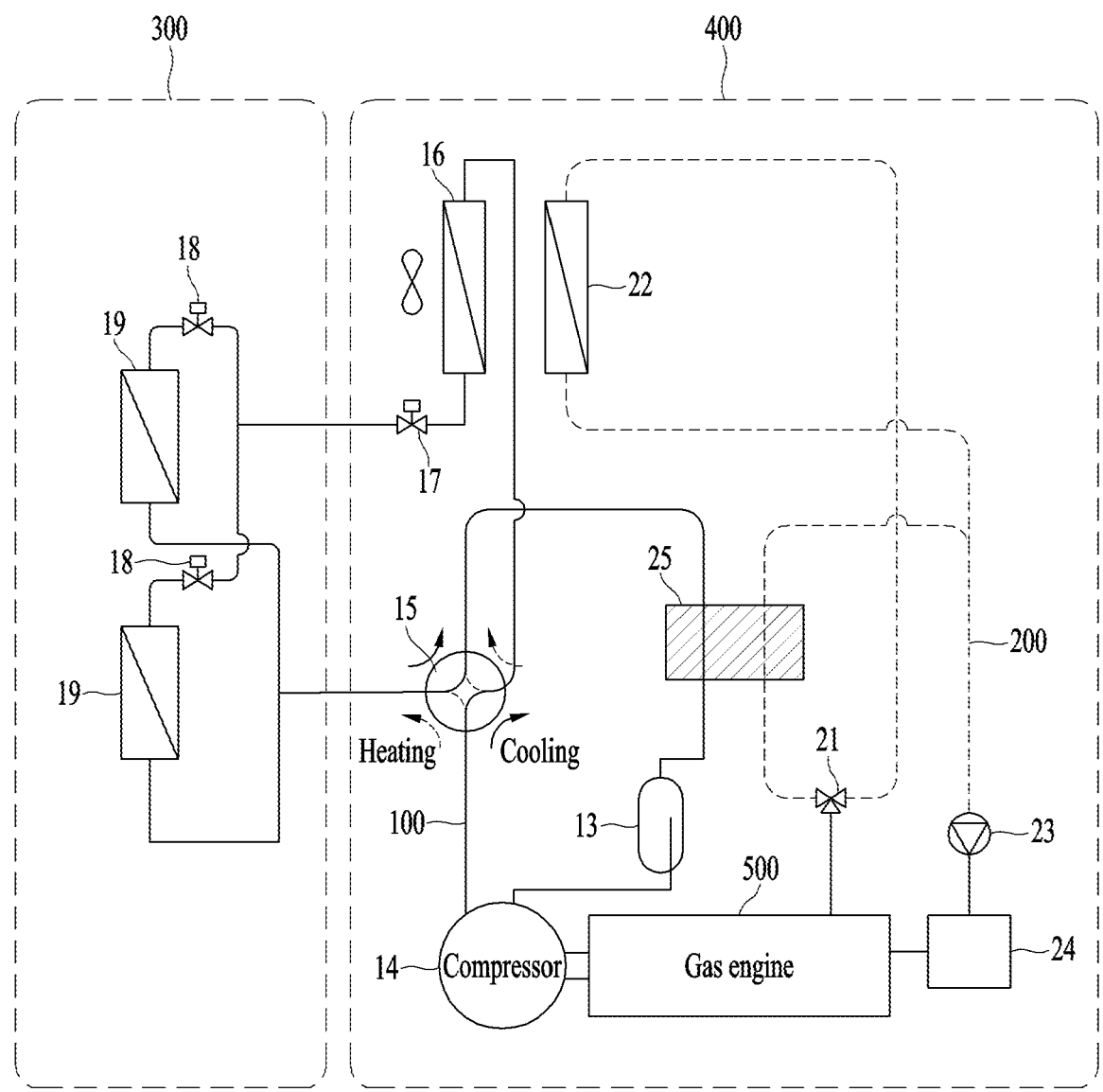
FIG. 1 shows a basic structure of a gas heat pump system.
Figure 2:
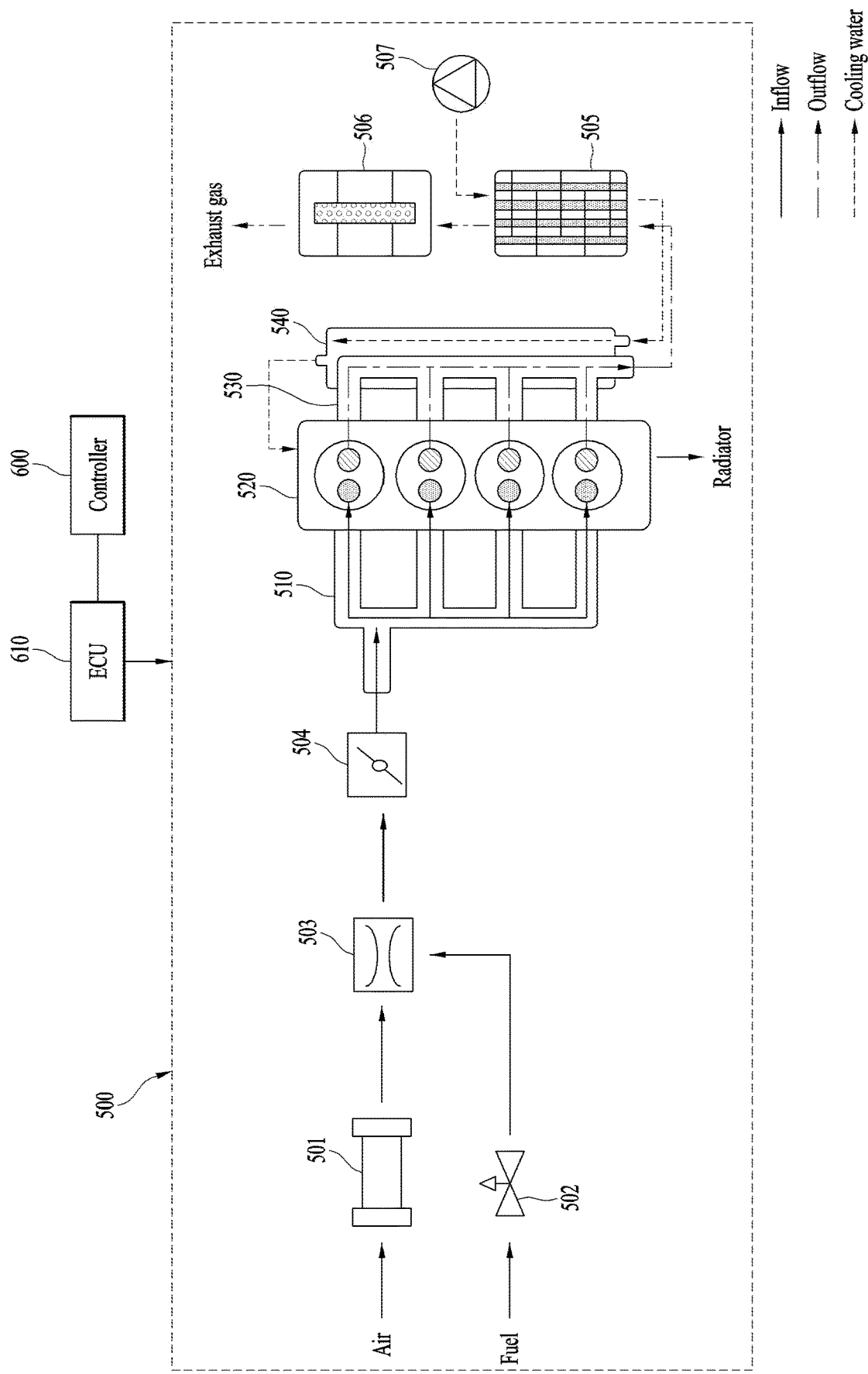
FIG. 2 illustrates a structure of a gas engine according to one embodiment of the present disclosure.

FIG. 2 shows an overall configuration of a gas engine 500 according to one embodiment of the present disclosure.

The gas engine 500 includes an engine combustion unit 520 defining a location where air and fuel are burnt, a supply pipe 510 corresponding to a channel supplying air and fuel to the engine combustion unit 520, an exhaust pipe 530 communicating with the engine combustion unit 520 and corresponding to a channel for exhausting exhaust gas generated from the combustion, and a cooling water pipe 550 for cooling the exhaust gas discharged through the exhaust pipe 530.

The engine combustion unit 520 includes a plurality of combustion chambers. In one embodiment of the present disclosure, an even number of combustion chambers are included. However, the present disclosure is not limited thereto. An odd number of combustion chambers may be present. The combustion chamber includes a housing 521 (see FIG. 3) defining an appearance, and an ignition plug 523 (see FIG. 3) for burning air and fuel into the housing 521.

The air and fuel introduced into the housing 521 involve in an explosion reaction via the ignition (discharge) of the ignition plug 523 provided in the housing 521. As a result of the explosion reaction, a cylinder 522 (see FIG. 3) provided in the housing 521 is subjected to a linear reciprocating motion. A kinetic energy due to the reciprocating movement of the cylinder rotates a crank 526 (see FIG. 3). The rotation of the crank 526 is transmitted to a rotary shaft (not shown) connected to a compressor to drive the compressor. That is, the rotation of the rotary shaft corresponds to an energy source for operating the compressor. The exhaust gas, which is a byproduct of the explosion reaction, is discharged to the exhaust pipe 530, and the exhaust gas exchanges heat with the cooling water.

It is general that a plurality of combustion chambers has the explosion reaction sequentially in a predetermined interval. That is, the ignition plugs 523 provided in the combustion chambers may be sequentially discharged at a predetermined interval.

The air and fuel to enter the engine combustion unit 520 are mixed with each other at a user-specified mixing ratio prior to entering the engine combustion unit 520. The air is introduced into the gas engine 500 through an air purification device 501 and the fuel is introduced into the gas engine 500 through a zero governor 502. The air and fuel thus introduced are mixed in the mixture 503 and then introduced into the supply pipe 510 through an ETC (Electronic Throttle Control) valve 504.

The air purification device 501 is configured for filtering foreign substances from air such that the explosion efficiency inside the engine combustion unit 520 can be maximized. The zero governor 502 keeps the outlet pressure constant at all times regardless of changes in the pressure and flow rate of the incoming fuel (gas). The mixture 503 functions to keep the mixture ratio between the air introduced from the air purification device 501 and the fuel (gas) introduced from the zero governor 502 constant. Thus, controlling the mixture ratio between air and fuel gas to be constant may allow the control of the combustion temperature to be facilitated.

The air and fuel mixed at a constant mixing ratio in the mixture 503 flows into the engine combustion unit 520 only by the required amount via the ETC valve 504. The ETC valve 504 refers to an electronic control throttle system that electronically controls the throttle valve. Specifically, the ETC valve 504 controls the opening and closing of the throttle valve according to the signal from an electronic accelerator pedal module. Compared to a mechanical throttle valve, the ETC valve can control the opening and closing more precisely.

The air and fuel passing through the ETC valve 504 flows into the supply pipe 510 and then divided into a plurality of branches and the branched fluids flow into the plurality of housings 521, respectively.

In this process, exhaust gas is generated when the air and fuel are burned in the plurality of housings 521, respectively. The exhaust gas thus generated is discharged through the exhaust pipe 530, and then passes through the exhaust gas heat exchanger 505 and a muffler 506 sequentially and then exhausted to the outside.

Meanwhile, the cooling water is absorbed by the cooling water pump 507 and passes through an exhaust gas heat exchanger 505, an exhaust manifold 540, and the engine combustion unit 520 sequentially and then is discharged to the radiator.

Figure 3:
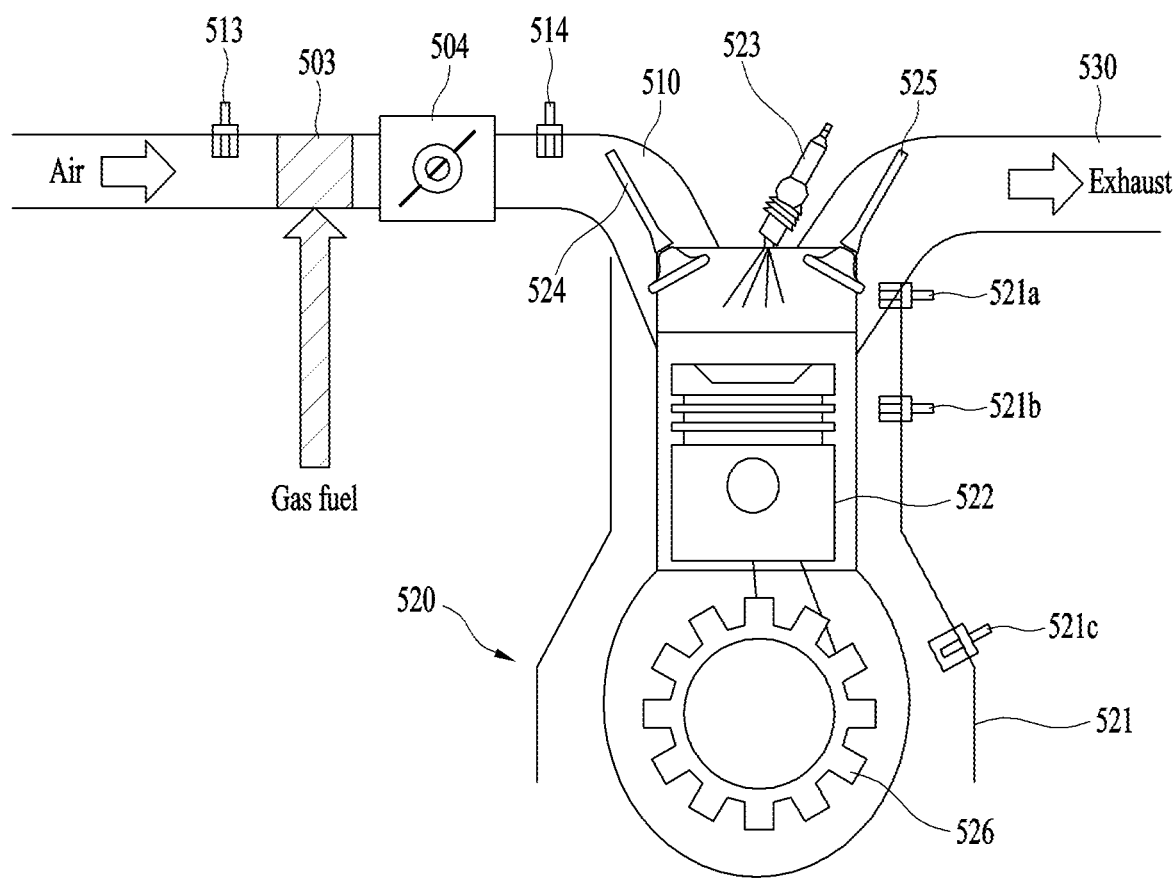
FIG. 3 shows a structure of an engine combustion chamber according to one embodiment of the present disclosure.

FIG. 3 is a view showing a detailed structure of a combustion chamber of one of the engine combustion chambers 520.

The supply pipe 510 includes a temperature sensor 513 for measuring the temperature of air and a pressure sensor 514 for measuring a pressure of a mixture of air and fuel.

When the temperature of the air entering the supply pipe 510 is too high, a probability of incomplete combustion in the combustion chamber increases. Therefore, after the temperature of the incoming air is measured using the temperature sensor 513, and when the measured temperature is above the predetermined temperature, a separate device is activated to interrupt the operation in the engine combustion chamber 520 or to cool the temperature of the incoming air.

A ratio of the incompletely combusted gas relative to the entirety of the mixture changes depending on a pressure of the mixture of the air and fuel. Therefore, the pressure of the mixture is measured using a pressure sensor 514 before the mixture is introduced into the housing 521 in order to adapt the pressure to the set optimal pressure. Thus, it is possible to determine whether to increase or decrease the pressure of the mixture based on the value measured by the pressure sensor 514.

In one example, the housing 521 may include a cylinder position sensor 521a for determining the position of the cylinder and a crankshaft position sensor 521c for determining how much the crank 526 has rotated.

The crank 526 is connected by the cylinder 522 via a connecting rod 527. One end of the connecting rod 527 is rotatably connected to an shaft passing through the center of the cylinder 522 while the other end thereof is connected to the crank 526 and is rotatably connected to the crank 526 to be spaced from a central rotation axis of the crank 526 at a predetermined distance.

Therefore, when the crank 526 rotates, the position of the connecting rod 527 continuously changes. The cylinder 522 is provided inside the cylinder housing 528 such that the motion thereof is limited only to a linear motion. The cylinder housing 528 is provided inside the housing 521 and communicates with a distal end of the supply pipe 510 and a distal end of the exhaust pipe 530. That is, the mixture of air and fuel supplied from the supply pipe 510 to the cylinder housing 528 is ignited by the ignition plug 523 inside the cylinder housing 528. The exhaust gas resulting from the ignition may be discharged to the outside through the exhaust pipe 530.

A side face of the cylinder 522 is brought into close contact with the cylinder housing 528 so that the cylinder 522 can move linearly within the cylinder housing 528. The side face of the cylinder 522 may be coated with special materials such that air and fuel do not leak between the surfaces of the cylinder 52 and the cylinder housing 528, and friction does not occur between the surfaces of the cylinder 52 and the cylinder housing 528. In one example, the cylinder 52 and the cylinder housing 528 may be made of a special material such that little friction may occur therebetween.

When the crank 526 rotates, the cylinder 522 reciprocates linearly due to a change in the position of the connecting rod 527.

A point where the supply pipe 510 and the cylinder housing 528 communicate with each other is controlled by an inflow valve 524. A point where the exhaust pipe 530 and the cylinder housing 528 communicate with each other is controlled by a discharge valve 525.

When the mixture of the air and fuel is fed into the cylinder housing 528, the inflow valve 524 opens and the discharge valve 525 closes. After the air and fuel mixture enters the cylinder housing 528, the inflow valve 524 is closed.

When both the inflow valve 524 and the discharge valve 525 are closed, the cylinder 522 is most distant from the crank 526. That is, the mixture of air and fuel introduced into the cylinder housing 528 is compressed as much as possible. At this time, the engine is controlled so that discharge is generated in the ignition plug 523.

The discharge of the ignition plug 523 causes an explosion reaction of the air and fuel mixture introduced into the cylinder housing 528. Thus, the cylinder 522 is pushed out by explosive force resulting from this explosion reaction. That is, the cylinder 522 reciprocates up and down due to the explosive force, and thus the crank 526 is rotated due to the linear reciprocating motion of the cylinder 522. The rotation of the crank 526 may allow the rotary shaft connected to the crank 526 to rotate to operate the compressor.

The discharge valve 525 is opened after the discharge to discharge the exhaust gas generated by the discharge of the ignition plug 523. The exhaust gas is discharged to an exhaust pipe 530 through the discharge valve 525.

When the exhaust gas has been exhausted, the discharge valve 525 is closed again and the inflow valve 524 is opened to allow fresh air and fuel mixture to flow thereto. Such an operating cycle may continue as long as the engine combustion chamber 520 is operated.

The plurality of combustion chambers may be provided. In this connection, the discharges of the ignition plugs 523 in at least some of the combustion chambers may occur at different times.

A cooling water temperature sensor 521*b* may be further provided in the housing 521. The temperature of the cooling water supplied to the outside of the cylinder housing 528 is measured by the cooling water temperature sensor 521*b*. When the temperature of the cylinder housing 528 is too high, a part thereof may wear down. Thus, when the temperature of the cooling water is measured to be higher than a reference temperature, it may be determined that the engine combustion chamber 520 is in a dangerous state and the operation of the engine combustion chamber 520 may be stopped.

As described above, the explosion power may vary in proportion to the amount of air and fuel flowing into the cylinder housing 528 or the amount of energy discharged from the ignition plug 523. That is, energy consumption may be minimized and maximum efficiency may be obtained when the explosion force is precisely controlled according to a load required by the compressor connected to the engine combustion chamber 520.

According to one embodiment of the present disclosure, the explosion power of the air and fuel mixture may be controlled by controlling the amount of energy discharged from the ignition plug 523. After determining a refrigerant load required by the compressor, a required output energy may be calculated according to the determined load, and then the amount of energy discharged from the ignition plug 523 may be adjusted based on the output energy.

The output energy required based on this load may be defined as a target ignition energy amount. In order to determine the target ignition energy amount, the controller may first determine a setting value specified by the user. For example, the controller may determine heating mode or cooling mode as selected by the user, a temperature set by the user, and an intensity of airflow as selected by the user. This setting values determination may be made by a controller 600 provided inside the gas heat pump. The controller 600 may be embodied as an Engine Control Unit (ECU) 610 to control the operation of the engine. In some cases, the controller 600 may be embodied as a separate component that controls the ECU 610 and drives the entirety of the gas heat pump. Hereinafter, an example in which the controller 600 is embodied as the ECU 610 will be set forth by way of example. However, the present disclosure is not limited thereto. Therefore, the controller 600 and the ECU 610 will be described below using the same reference numeral 610.

Depending on the heating/cooling mode, the set temperature and airflow intensity, the required refrigerant load may vary. In this connection, a rotational speed of the compressor may vary depending on the required refrigerant load. The output amount of the gas engine 500 that rotates the compressor may be predetermined according to the refrigerant load as determined above. The relationship between the refrigerant load and the output of the gas engine 500 may be obtained experimentally beforehand and stored in advance in the controller 610 in a form of a table.

Once the output of the gas engine 500 is determined, the output energy amount required by the ignition plug 523 may be determined according to this output. That is, the required refrigerant load may be determined according to the values set by the user, such as cooling/heating mode, temperature, or wind intensity as selected by the user. Then, the output amount of the gas engine 500 may be determined according to the determined refrigerant load. Finally, the output energy amount required by the ignition plug 523 may be determined according to the determined output amount.

This output energy amount may be controlled by varying a length of a dwell time. The longer the dwell time, the larger the amount of current flowing in a primary coil 611 (see FIG. 4). This is because the coil acts as the inductor. In the inductor, a value of resistance gradually decreases over time after voltage is applied thereto. That is, as the value of the resistance gradually decreases over time, and the voltage applied is constant. Thus, the amount of the flowing current may gradually increase in the inductor over time.

When ignition (discharge) occurs from the ignition plug 523, a time duration during which the ignition (discharge) is sustained may vary depending on the magnitude of the current applied to the primary coil 611. The larger the magnitude of the current, the longer the time during the ignition (discharge) is sustained. The smaller the magnitude of the current, the shorter the time during the ignition (discharge) is sustained.

The magnitude of the output energy amount is associated with a length of time for which the ignition (discharge) takes place. This is because the output energy amount is calculated by time-integrating a product of the applied voltage and the supplied current. Therefore, when the dwell time becomes longer, the amount of current flowing in the primary coil 611 gradually increases. The output energy amount may be larger because the time for which the ignition (discharge) is sustained is prolonged.

In one example, the output energy amount may be adjusted by varying the magnitude of the applied voltage. As the magnitude of the voltage applied to the primary coil 611 increases, a higher voltage may be generated in the secondary coil 612.

Further, as the magnitude of the voltage applied to the primary coil 611 increases, the desired amount of current may be achieved even when the dwell time is short. That is, even when the same dwell time is used, the amount of the current as achieved may vary according to the magnitude of the voltage applied at the beginning. Thus, in order to reach the same target amount of current, the larger the magnitude of the applied voltage, the shorter the dwell time.

In summary, the magnitude of the output energy amount may be controlled by changing the length of the dwell time and the magnitude of the voltage applied to the primary coil 611.

When the ignition plug 523 is controlled using the magnitude of the output energy, there is an advantage that the output of the gas engine 500 may be controlled more precisely according to the refrigerant load of the compressor.

Figure 4:
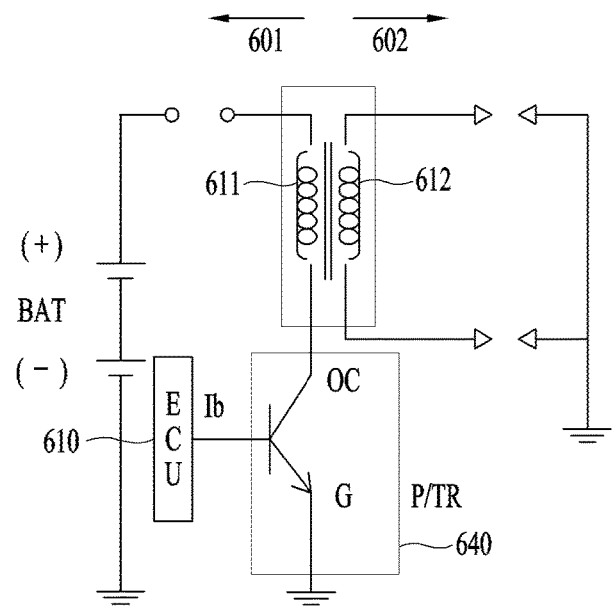
FIG. 4 is a simplified illustration of a transformation process of an ignition plug according to one embodiment of the present disclosure.
Figure 5:
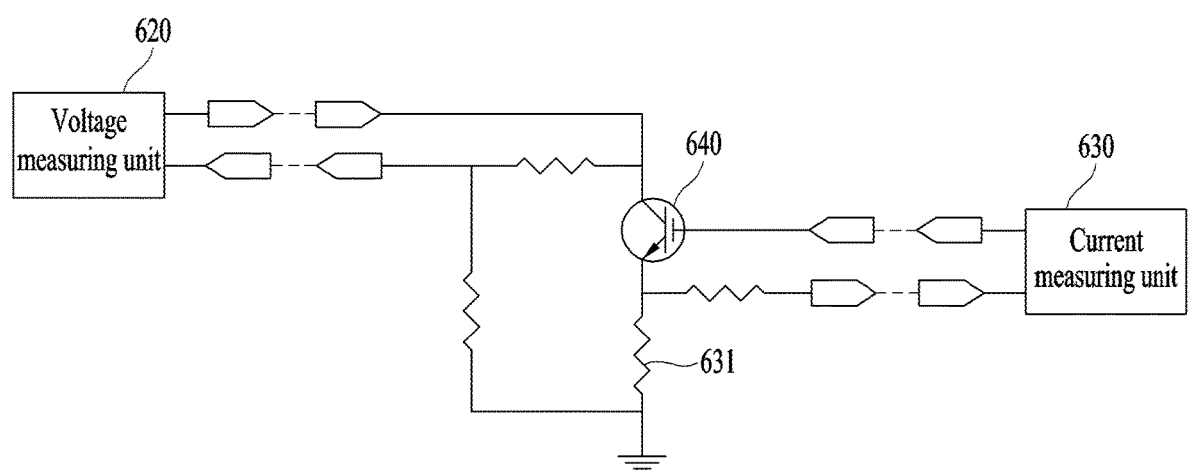
FIG. 5 is a simplified illustration of a current measurement circuit according to one embodiment of the present disclosure.

FIG. 4 and FIG. 5 show a simple circuit for measuring voltage and current.

FIG. 4 shows a circuit that raises a low voltage to a high voltage. In order to ignite the mixture of air and fuel, it is possible to raise the voltage up to 20,000 to 30,000 volts V to generate spark. However, a battery mounted on the circuit outputs a low voltage of 10 to 30 volts.

To increase the voltage, an electromagnetic induction of a transformer 610 composed of a coil is used. The coil constituting the transformer 610 may include, for example, a secondary coil 612 having about 20,000 to 30,000 turns of a thin copper wire having about a thickness of a hair wound around a rod shaped iron core, and the primary coil 611 having 150 to 300 turns of a copper wire of about 0.5 to 1 mm thickness wound around a rod shaped iron core in the same direction as the secondary coil.

In this connection, when the current flows in the primary coil 611 by applying a voltage or the flow of current is interrupted, the iron core may act as an electromagnet. A current of a high voltage may flow through the secondary coil 612 due to an electromagnetic induction phenomenon when the current flowing in the primary coil 611 stops.

A switching element 640 provided in the circuit may block the current flowing in the primary coil 611. When the switching element 640 receives an ignition signal from the controller or ECU 610, the switching element 640 may block the current flowing in the primary coil 611 such that a high voltage is induced in the secondary coil 612. In this connection, the switching element 640 may employ a power transistor, for example, an insulated gate bipolar mode transistor (IGBT).

A part that includes the primary coil 611 and allows or disallows the current flow in the primary coil 611 may be referred to as an ignition coil part 601. A part that includes the secondary coil 612 and the ignition plug 523 may be defined as an ignition plug part 602.

The operation of the ignition plug 523 is not limited thereto. The scheme as described above corresponds to a full transistor ignition scheme. Point ignition or distributorless ignition schemes may be used.

FIG. 5 shows a circuit structure capable of measuring current according to one embodiment of the present disclosure.

The current measurement is made by measuring the current flowing through a shunt resistor 631, which has a very small resistance. At this time, the current measuring unit 630 measures the current flowing through the shunt resistor 631. A voltage is measured via a voltage measuring unit 620. The amount of energy applied to the ignition plug 523 may be calculated in advance by providing the circuit capable of measuring the voltage and the current in advance.

Figure 6:
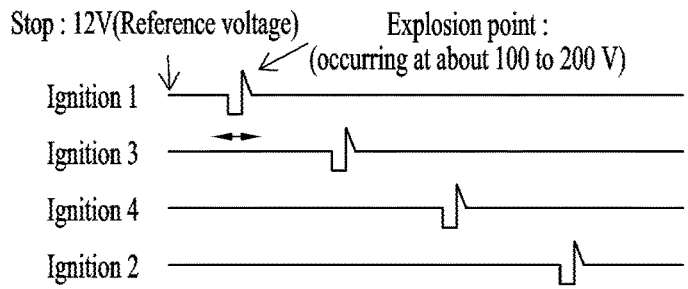
FIG. 6 is a simplified illustration of an ignition process in the engine combustion chamber based on voltage, according to one embodiment of the present disclosure.

FIG. 6 illustrates a voltage applied to each of four combustion chambers in the combustion chamber 520 according to one embodiment of the present disclosure. Referring to FIG. 6, the change in voltage applied to the primary coil 611 in each combustion chamber is shown. The ignition plugs 523 in the combustion chambers may execute ignitions sequentially.

The voltage corresponding to the capacity of the battery may be constantly applied to the ignition plug 523 before the ignition occurs. When the switching element 640, upon receiving the signal from the controller 610, blocks the current applied to the primary coil 611, a high voltage may be generated in the secondary coil 612.

The dwell time may be present to control the amount of current applied to the primary coil 611. This dwell time corresponds to a bottom period of a pulse (indicated by a bi-directional arrow) in FIG. 6. After the dwell time, the switching element 640 interrupts the current applied to the primary coil 611 such that a high voltage is generated in the secondary coil 612. This may lead to an ignition (discharge) from the ignition plug 523.

Figure 7:
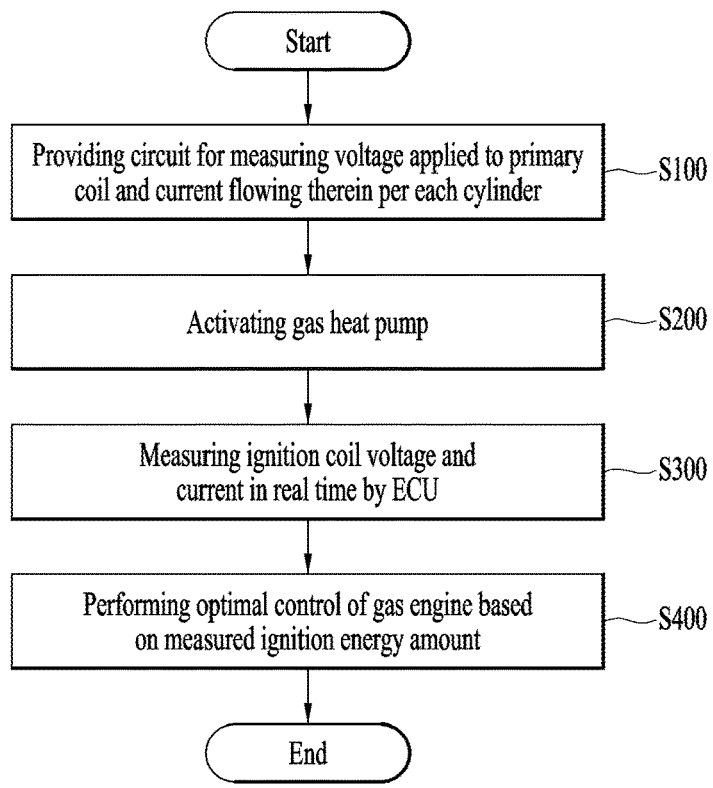
FIG. 7 is a flow chart illustrating a basic algorithm according to one embodiment of the present disclosure.

FIG. 7 is a simplified flow chart illustrating an operation according to the present disclosure.

According to one embodiment of the present disclosure, since the intensity of ignition is controlled based on the amount of energy generated when ignition (discharge) occurs in the ignition plug 523, measurement of the voltage and current may be required.

Therefore, a step S100 may be required in which a circuit for measuring the voltage applied to the primary coil 611 and the current flowing therein per each cylinder 522 is prepared.

The gas engine 500 may be activated using the circuit capable of measuring the voltage and current (S200).

When the gas engine 500 is activated, the ignition coil voltage applied to the primary coil 611 and current flowing therein may be measured in real time by the controller 610 at S300. This may be done in real time to determine whether the target ignition energy amount is achieved each time one time ignition (discharge) occurs from a single ignition plug 523. Then, the actual output energy amount may be calculated based on the measured information and may be reflected in a next ignition.

Subsequently, a process S400 of performing an optimal control of the gas engine 500 based on the measured information may be performed.

Figure 8:
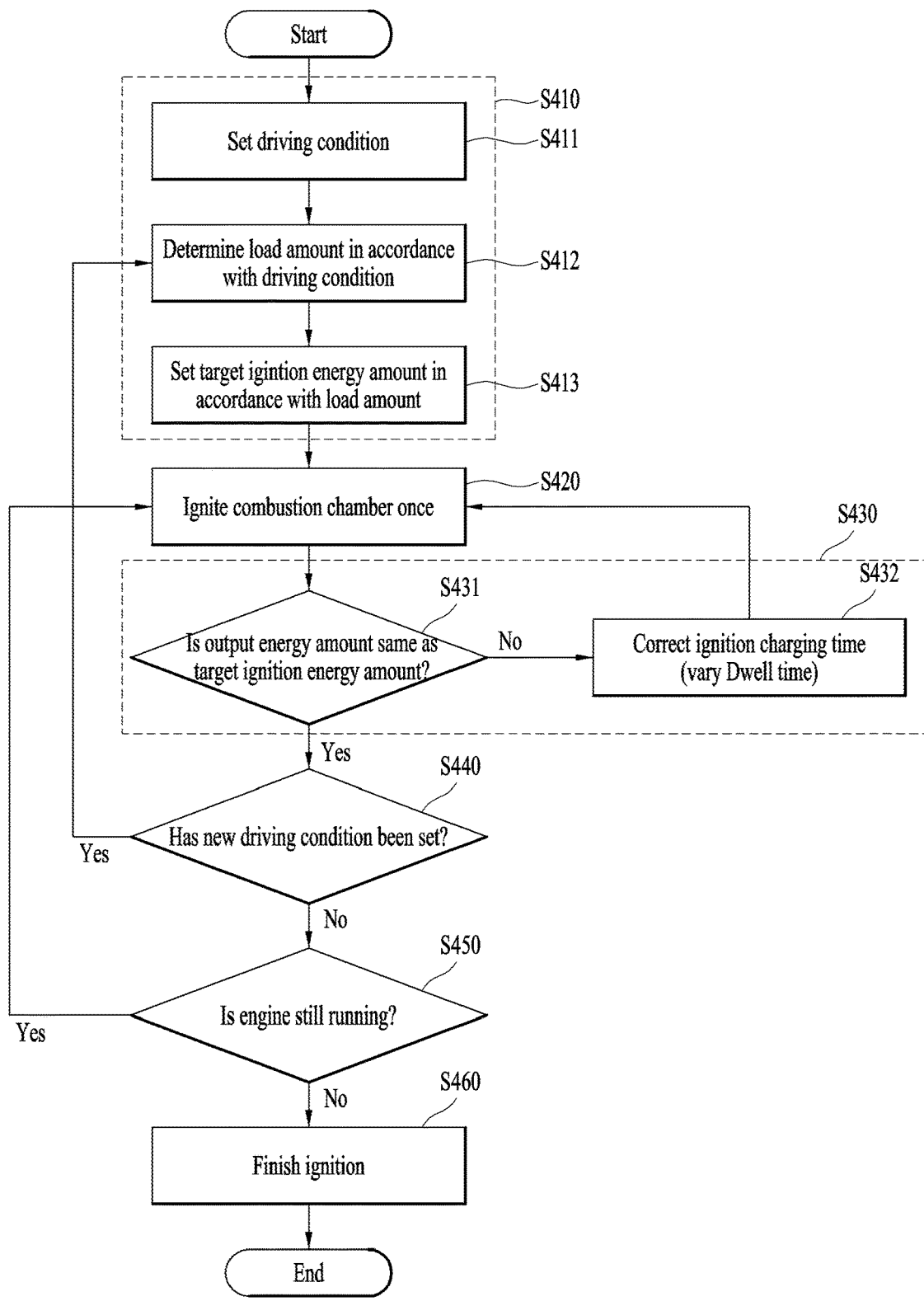
FIG. 8 is a flow chart showing an algorithm for operating the engine combustion chamber using an amount of energy according to one embodiment of the present disclosure.

As described above, the process S400 of performing control of the gas engine 500 based on the measured information according to an embodiment of the present disclosure is illustrated in detail using a flowchart in FIG. 8.

In one example, the cooling mode or heating mode, the temperature setting, and/or the intensity of the air flow as set or selected by the user or via an automatic system may be determined by the controller 610. That is, the heating/cooling operation condition (heating/cooling cycle) may be set in S410.

The controller 610 may receive the above setting conditions from the outside. Thus, the operating conditions may include at least one of the cooling and heating mode setting, the temperature setting, and the intensity setting of the air flow.

Specifically, the controller 610 may set a heating/cooling cycle condition at step S411.

When the cooling/heating operation condition has been set, the controller 610 determines the required refrigerant load according to the set condition. That is, the controller 610 may determine the load based on the cooling/heating and cycle condition. This determination may be made in real time. Alternatively, the load based on the cooling/heating and cycle condition may be determined from the table stored in the controller 610.

The controller 610 then sets the target ignition energy amount according to the required refrigerant load (S413). This target ignition energy amount may be set by the controller 610. Alternatively, the target ignition energy amount based on the refrigerant load may be determined using the pre-stored table.

When the target ignition energy amount is set as described above, the controller 610 may control the ignition plug 523 in the combustion chamber to generate one-time ignition (discharge) at S420.

In this case, the actual output energy amount may be calculated by measuring the magnitude of the supplied current which varies according to the voltage applied to the primary coil 611 and the dwell time during one time ignition discharge. This calculation may be made by the controller 610.

When the actual output energy amount has been calculated, the controller 610 may determine whether the target ignition energy amount and the output energy amount are equal to each other and to vary the ignition condition based on the determination.

Specifically, when the actual output energy amount has been calculated, the controller 610 may compare the target ignition energy amount and the output energy amount and determine whether they are equal to each other at step S431.

In this connection, when the target ignition energy amount and the output energy amount are different from each other, the controller 610 may correct the amount of energy required for ignition. In an example, the controller 610 may correct the dwell time at step S432.

For example, when the output energy amount is smaller than the target ignition energy amount, the controller may increase the dwell time before ignition in a next ignition time. When the dwell time has been increased, the magnitude of the current applied to the primary coil 611 before the ignition (discharge) is increased and the time for which the ignition (discharge) continues may be further increased. Therefore, the output energy amount becomes large at the next ignition (discharge).

To the contrary, when the output energy amount is greater than the target ignition energy amount, the dwell time may then be reduced at the next ignition. When the dwell time is decreased, the magnitude of the current applied to the primary coil 611 before the ignition (discharge) is reduced, and, the time for which the ignition (discharge) is sustained may be further reduced. Therefore, the output energy amount may be reduced at the next ignition (discharge).

In one example, although not shown in FIG. 8, a process of correcting the amount of energy required for ignition may be adjusted by varying the magnitude of the voltage applied to the primary coil 611.

When the voltage magnitude is reduced while the dwell time is fixed, the magnitude of the current applied to the primary coil 611 may decrease before the ignition (discharge) occurs. Accordingly, the time for which the ignition discharge is maintained may be further reduced.

Thus, when the output energy amount is greater than the target ignition energy amount, the magnitude of the voltage applied to the primary coil 611 may be reduced at the next ignition. When the output energy amount is smaller than the target ignition energy amount, the magnitude of the voltage applied to the primary coil 611 may be increased at the next ignition.

Since a final criterion is the output energy amount, the dwell time and/or the magnitude of the voltage may be changed depending on the situation to change the output energy amount.

In one example, when the output energy amount and the target ignition energy amount are equal to each other, the controller may determine whether the cooling/heating condition, temperature setting, and air flow intensity setting have been changed by the user or the system. That is, the controller may determine whether a new operating condition is set (S440).

In this connection, when the setting is changed, or when the new operation condition is set, the required refrigerant load varies. Thus, when the refrigerant load is changed, the target ignition energy amount may be changed. Thus, when the settings slightly change, the controller may need to perform the above steps.

In this connection, when the setting is changed, or when the new operation condition is set, the refrigerant load determination step S412 may be performed again based on the changed setting condition. When the required target ignition energy amount is then reset based on the changed required refrigerant load, a new ignition (discharge) may occur from the ignition plug 523.

In one example, when there is no new setting change, the controller may determine whether the engine is still running or not (S450).

In this connection, when the engine does not continue to run, the plug does not execute the ignition because the ignition (discharge) is not necessary (S460).

To the contrary, when the engine continues to operate, the method may return to step S420 where new ignition (discharge) may occur from the ignition plug 523. Unless the new setting change occurs, or unless the engine continues to operate, the controller may continuously determine whether the output energy amount and the target ignition energy amount are equal to each other each time the ignition (discharge) occurs. When it is determined that the output energy amount and the target ignition energy amount are equal to each other, the dwell time may be corrected or the magnitude of the applied voltage may be corrected.

As described above, since the controller 610 can determine and correct the output energy amount every time ignition occurs from the ignition plug 523, the energy efficiency can be greatly improved compared to the conventional one. Further, since the controller receives the feedback based on the amount of energy, the controller may more precisely control ignition (discharge) compared to the conventional method.

The embodiments of the present disclosure as disclosed herein and in the drawings are merely illustrative of specific examples for purposes of understanding. The scope of the present disclosure is not intended to be limited to the embodiments. It will be apparent to those skilled in the art that other modifications based on the technical idea of the present disclosure are feasible in addition to the embodiments as disclosed herein.

INDUSTRIAL APPLICABILITY

In accordance with the present disclosure, the engine control has the effect of varying the dwell time according to the amount of ignition energy emitted from the ignition plug and of achieving precise control.

What is claimed is:

1. A method for controlling a gas heat pump, wherein the gas heat pump includes:
    a compressor for compressing refrigerant; and
    a gas engine for driving the compressor, wherein the gas engine includes:
    an engine combustion unit having a plurality of combustion chambers; and
    an ignition plug disposed on each of the engine combustion chambers, and for combusting mixture of air and fuel,
    wherein the method comprises:
    determining a refrigerant load based on a cooling or heating mode or temperature setting;
    determining an output amount of the gas engine based on the determined refrigerant load;
    setting a target ignition energy amount required by the ignition plug based on the output amount;
    igniting the ignition plug in each combustion chamber;
    measuring a magnitude of current varying based on voltage applied to the ignition plug and based on a dwell time of the ignition plug in a real time manner per each ignition time; and
    comparing an actual output energy amount generated from the ignition with the set target ignition energy amount; and
    changing an amount of energy required to ignite the fuel when the output energy amount and the target ignition energy amount are not equal to each other.

2. The method of claim 1, wherein changing the amount of energy required to ignite the fuel includes changing a dwell time.

3. The method of claim 2, wherein when the output energy amount is greater than the target ignition energy amount, the dwell time decreases.

4. The method of claim 2, wherein when the output energy amount is smaller than the target ignition energy amount, the dwell time increases.

5. The method of claim 1, wherein when changing the amount of energy required to ignite the fuel includes adjusting a voltage applied to the ignition plug.

6. The method of claim 5, wherein when the output energy amount is greater than the target ignition energy amount, a magnitude of the voltage decreases.

7. The method of claim 5, wherein when the output energy amount is smaller than the target ignition energy amount, a magnitude of the voltage increases.

8. The method of claim 1, wherein the method further comprises, when the output energy amount is equal to the target ignition energy amount, determining whether the operating condition has changed.

9. The method of claim 8, wherein when the operating condition has changed, setting the target ignition energy amount includes setting a new refrigerant load and a new target ignition energy amount.

10. The method of claim 8, wherein the method further comprises, when the operating condition has not changed, determining whether the gas engine is currently running.

11. The method of claim 10, wherein when the gas engine currently stops, the ignition terminates.

12. The method of claim 1, wherein each of the output energy amount and the target ignition energy amount is calculated by integrating a product of a voltage and current applied to the ignition plug over the ignition time duration.

13. A gas heat pump, comprising:
    a compressor for compressing refrigerant;
    a gas engine for driving the compressor, wherein the gas engine includes an engine combustion unit having a plurality of combustion chambers;
    an ignition plug disposed on each of the engine combustion chambers, wherein the plug applies an impulse voltage; and
    a controller for controlling a voltage and current applied to the ignition plug and a discharge time of the plug,
    wherein the controller is configured for:
    determining a refrigerant load based on a cooling or heating mode or temperature setting;
    determining an output amount of the gas engine based on the determined refrigerant load;
    setting a target ignition energy amount required by the ignition plug based on the output amount
    measuring a magnitude of current varying based on voltage applied to the ignition plug and based on a dwell time of the ignition plug in a real time manner per each ignition time; and;
    comparing an actual output energy amount generated from discharge of the ignition plug with the set target ignition energy amount; and
    changing an amount of energy required to ignite the fuel when the output energy amount and the target ignition energy amount are not equal to each other.

14. The gas heat pump of claim 13, wherein the controller is configured for changing a dwell time, when the output energy amount and the target ignition energy amount are not equal to each other.

15. The gas heat pump of claim 13, wherein the controller is configured for changing a magnitude of a voltage applied to the ignition plug, when the output energy amount and the target ignition energy amount are not equal to each other.

* * * * *